UNITED STATES PATENT OFFICE.

JOHN ALLEN, OF NEW YORK, N. Y.

MODE OF PREPARING A COMPOSITION FOR FUEL BY THE AID OF CALCAREOUS CEMENTS.

Specification forming part of Letters Patent No. 643, dated March 17, 1838.

*To all whom it may concern:*

Be it known that I, JOHN ALLEN, of the city of New York, in the county and State of New York, have invented a new and useful Composition of Matter to be Used as Fuel, and to be called "Compound Coal;" and I do hereby declare that the following is a full and exact description thereof.

Take from eighty to ninety parts of coal-dust or fine coal—such as makes from handling, breaking, or sifting the anthracite or hard coal—or the dust of peat-coal, with from ten to twenty parts of ground plaster or gypsum as prepared for use as cement, and water sufficient to mix them to the consistence of thick cream. Then expose the mixture to the operation of a press or to the air and sun, and in a few moments it will be sufficiently firm and dry to bear transportation. Immediately preceding the process of cement it may be easily cut into blocks or squares. of any size or shape, with knives or with a machine constructed for that purpose. As the cementing-power of the plaster is expended very suddenly and within one or two minutes after the water is applied, it is highly important, indeed absolutely necessary, that the mixing should be performed with haste, so that it may be spread out and made level and smooth, ready for the press or cutting-machine at the critical moment. The time indicated for the application of the cutting knives or machine by the appearance of the mixture is by its assuming a rough appearance on the surface, by dropping into little holes, as the water disappears. If the mixture is stirred or disturbed during the expenditure of the cementing-power, it leaves it in mortar, and is unfit for use, unless it is submitted to a heavy pressure and exposed to the air and sun.

Another form of the compound is by the use of lime in the above proportions, instead of plaster, in which case less care is required in the process of compounding, the cementing properties of lime being much slower and less powerful, and therefore requiring more pressure, or, if dried by evaporation, more air and sun. Another form is prepared by a combination of plaster and lime in various proportions, according to the power of the press or the dryness of the atmosphere, the increase of plaster requiring less of either, the increase of lime requiring an increase of both. Another form is prepared by any of the above proportions by adding to the coal-dust from ten to twenty per cent. of the dust of Liverpool coal or other bituminous coal. Another form is prepared by the use of the above proportion of coal-dust, in combination with from ten to twenty per cent. of cement, such as is used generally in hydraulic structures, and prepared in a variety of ways.

This compound is ignited and used, as any of the hard coals are used, as fuel.

The inventor in this case claims having discovered that the dust of hard coal, peat-coal, or bituminous coal may be, by combining it with plaster or gypsum, or with lime, or with cement, or with plaster and lime, or with plaster and cement, or with lime and cement, in the proportions of from eighty to ninety per cent. of dust with from ten to twenty per cent. of the other enumerated articles, put into such form, and by evaporation or compression, or by both, have imparted to it such solidity and other requisite qualities for transportation and combustion, that it may be used as fuel in any and every manner in which coal is generally used.

Witness my hand this 17th day of January, 1838.

JOHN ALLEN.

Witnesses:
R. A. READING,
L. JUSTICE.